US007729441B2

(12) United States Patent
Taylor

(10) Patent No.: US 7,729,441 B2
(45) Date of Patent: Jun. 1, 2010

(54) METHOD AND SYSTEM FOR DATA TRANSMISSION WITH DECREASED BIT ERROR RATE

(75) Inventor: Richard Duane Taylor, Moneta, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 895 days.

(21) Appl. No.: 11/516,298

(22) Filed: Sep. 5, 2006

(65) Prior Publication Data
US 2008/0031378 A1 Feb. 7, 2008

Related U.S. Application Data

(63) Continuation-in-part of application No. 11/498,510, filed on Aug. 3, 2006, now abandoned.

(51) Int. Cl.
*H04L 27/00* (2006.01)

(52) U.S. Cl. .................. 375/295; 327/291; 332/106; 341/20; 341/123

(58) Field of Classification Search .......... 375/295; 327/291; 332/106; 341/20, 123
See application file for complete search history.

(56) References Cited

U.S. PATENT DOCUMENTS

| 5,177,455 | A | * | 1/1993 | Bennett | 332/103 |
| 5,541,953 | A | | 7/1996 | Hiben et al. | |
| 6,628,728 | B1 | * | 9/2003 | McCarty, Jr. | 375/296 |
| 7,027,498 | B2 | * | 4/2006 | McCarty, Jr. | 375/232 |
| 2003/0185313 | A1 | | 10/2003 | Beaulieu | |
| 2003/0215031 | A1 | * | 11/2003 | Schaumont et al. | 375/340 |
| 2005/0078767 | A1 | * | 4/2005 | Liu | 375/297 |
| 2009/0110033 | A1 | * | 4/2009 | Shattil | 375/141 |

FOREIGN PATENT DOCUMENTS

EP  1 659 748 A1  5/2006

OTHER PUBLICATIONS

Ohno, "Postdetection diversity reception of QDPSK signals under frequency selective Rayleigh fading", 1990 IEEE 40th Vehicular Technology Conference, May 6-9, 1990 pp. 431-436.*
Yamada, "High-speed optical pulse transmission at 1.29-μm wavelength using low-loss single-mode fibers" IEEE Journal of Quantum Electronics, Publication Date: Nov. 1978, vol. 14, Issue: 11 On pp. 791-800 ISSN: 0018-9197.*
Choi, "Compensating frequency drift in DPSK systems via baseband signal processing", IEEE Transactions on Communications, Publication Date: Aug. 1997 vol. 45, Issue: 8 On pp. 921-924 ISSN: 0090-6778.*

(Continued)

*Primary Examiner*—Juan A Torres
(74) *Attorney, Agent, or Firm*—Fox Rothschild, LLP; Robert J. Sacco

(57) ABSTRACT

A method for generating a modulated carrier signal with reduced bit error rates based on a plurality of data symbols. A plurality of data symbols are received, and a digital input signal is generated based on the plurality of data symbols. The digital input signal are filtered to produce a digital output signal including a phase characteristic. The phase characteristic of the digital output signal remains close to the desired symbol phase for substantial portion of the symbol period. A carrier signal is modulated using the digital output signal to produce the modulated carrier signal.

20 Claims, 12 Drawing Sheets

OTHER PUBLICATIONS

Gunther, "DOQPSK-differential demodulation of filtered offset QPSK", 1994 IEEE 44th Vehicular Technology Conference, Jun. 8-10, 1994 pp. 1542-1546 vol. 3.*

Kwon, "Improved zero-crossing demodulator for minimum shift keying under static environments", Global Telecommunications Conference, 1995, Globecom '95, IEEE vol. 2, Nov. 13-17, 1995 pp. 1024-1028 vol. 2.*

Sandeep Chennakeshu et al. "Differential Detection of π/4-Shifted-DQPSK for Digital Cellular Radio", IEEE Transactions on Vehicular Technology, vol. 42, No. 1, Feb. 1993.

Steve Kuh et al. "Continuous Phase Quandrature Phase Shift Keyed (CPQPSK) Signaling Technique", IEEE 1988, pp. 0157-0161.

Theodore S. Rappaport "Wireless Communications Principles & Practices", Linear Modulation Techniques, Prentice-Hall, 1996, pp. 249-252.

William C. Jakes, "Microwave Mobile Communications", The Institute of Electrical and Electronics Engineers, Inc., pp. 220-223, Copyright 1974 IEEE Press, Piscataway, NJ.

APCO Project 25 Common Air Interface Draft Document dated Jul. 26, 1993, 38 pages.

APCO Project 25 Digital Transceiver Performance Requirements Draft (TR 8.6194/01/0035); Jan. 1994, 52 pages.

International Search Report, International Application No. PCT/US2007/017203, International Filing Date Feb. 8, 2007.

Gentile K: "The Care and Feeding of Digital, Pulse-Shaping Filters" RF Design, *Primedia Business Magazines & Media*, vol. 25 No. 4, Apr. 1, 2002, pp. 50,52,54,56,58,61.

TIA/EIA Standard: "Project 25 FDIMA Common Air Interface New Technology Standards Project Digital Radio Technical Standards" May 1998, pp. 1-87.

* cited by examiner

METHOD AND SYSTEM FOR DATA TRANSMISSION WITH DECREASED BIT ERROR RATE

RELATED APPLICATIONS

This application is a continuation-in-part of prior application Ser. No. 11/498,510, filed on Aug. 3, 2006 now abandoned.

FIELD OF THE INVENTION

The invention relates generally to systems and methods for simulcast data transmission, and more particularly to systems and methods for simulcast data transmission with decreased bit error rate.

BACKGROUND OF THE INVENTION

Radio communication systems are used in many different applications. For example, law enforcement and emergency personnel frequently use radio systems to communicate with each other. In some applications, simulcast radio communication systems are used to communicate with a number of fixed or mobile radios (hereafter called "terminals") spaced over a large geographic area. Simulcast communication systems operate by transmitting from multiple site locations, hereafter called "sites." Each site has one or more base stations that transmit a signal to communicate with the terminals. In a simulcast system, communication signals typically are transmitted at about the same time by all sites in the system. The communications may be received by a variety of different types of terminals, including handheld radios, vehicular radios, etc. A given radio will receive communications from the system as long as the radio is within the transmission range of at least one of the multiple simulcast sites.

In some situations, a radio may experience interference if it is within the transmission range of more than one simulcast site. For example, if a terminal is within range of two simulcast sites, it will receive the same communication signal from both sites—but not necessarily at the same time. This typically occurs if the terminal is closer to one site that it is to the other site. In this case, because of the different transmission distances, there will be a slight delay in receiving the signal from the further site (relative to receipt of the same signal from the nearer site). As a result of this delay, the signals received from the two sites may interfere with one another. This interference is a form of "delay spread fading."

High delay spreads in a simulcast system can result in significant signal degradation, with the degree of degradation influenced by the type of modulation that is used. For digital modulations, a metric for quantifying delay spread degradation is the bit error rate (BER).

One type of modulation is defined by the Project 25 (P25) standard for public safety radio communications. Project 25 is defined by a suite of American National Standards and other documents developed by the Telecommunications Industry Association (TIA). The P25 Phase 1 specification includes two alternative digital modulation schemes, C4FM and CQPSK. C4FM is a constant-envelope, four-level frequency modulation scheme that operates in 12.5 kHz channels. CQPSK is a compatible differential four-level quadrature phase shift keying modulation scheme, which, when designed in accordance with P25 specification design parameters, requires less bandwidth than C4FM. Both C4FM and CQPSK as defined in the P25 specification provide a symbol transmission rate of 4800 baud using two bits per symbol. The resulting total channel throughput is 9600 bits per second (bps).

The amount of delay spread degradation in a simulcast system is influenced by the duration of the delay relative to the symbol transmission period. The C4FM and CQPSK modulation schemes used in P25-compatible systems transmit one symbol every 208.33 microseconds. When the delay spread in these systems is less than 20 microseconds, the resulting bit error rate for strong signals typically is less than 1%. As the delay spread increases, however, the bit error rate also increases. For example, a delay spread of 60 microseconds results in a strong-signal bit error rate of over 5%, which is enough to substantially degrade communication quality. With higher delay spreads, the degradation in communication quality becomes even worse.

Simulcast systems typically are designed to minimize delay spread. To a certain extent, system designers are able to reduce delay spread by adjusting site placement, antenna gain, tower height, and signal transmission timing. As a practical matter, however, it is extremely difficult if not impossible to entirely eliminate delay spread, and relatively high delay spreads (i.e., 100 microseconds or more) are not uncommon.

Accordingly, there is a need for systems and methods that provide for simulcast transmission with reduced bit error rates. There also is a need for systems and methods with reduced bit error rates that are compatible with existing simulcast systems, such as P25-compatible systems.

BRIEF SUMMARY

According to one aspect of the invention, there is a method for generating a modulated carrier signal based on a plurality of data symbols. The data symbols are received, and a digital input signal is generated based on the data symbols. The digital input signal is filtered to produce a digital output signal including a phase characteristic. The phase characteristic of the digital output signal remains within about ten degrees of a desired symbol phase for a duration that exceeds 50% of a symbol period corresponding to a symbol transmission rate. The carrier signal is modulated using the digital output signal to produce the modulated carrier signal.

According to another aspect of the invention, there is a transmitter for a modulated carrier signal based on a plurality of data symbols. The transmitter includes a converter configured to receive the plurality of data symbols and generate a digital input signal based on the plurality of data symbols. A pulse-shaping filter is configured to receive the digital input signal and produce a digital output signal including a phase characteristic. The filter is further configured to maintain the phase characteristic of the digital output signal within about ten degrees of a desired symbol phase for a duration that exceeds 50% of a symbol period corresponding to a symbol transmission rate. A modulator is configured to modulate a carrier signal using the digital output signal to produce the modulated carrier signal.

According to another aspect of the invention, there is a filtering apparatus. The filtering apparatus includes a filter configured to receive a digital input signal based on a plurality of data symbols and produce a digital output signal including a phase characteristic. The filter is further configured to maintain the phase characteristic of the digital output signal within about ten degrees of a desired symbol phase for a duration that exceeds 50% of a symbol period corresponding to a symbol transmission rate.

Other methods, apparatus, systems, features, and advantages of the invention will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PRESENTLY PREFERRED EMBODIMENTS

Embodiments of the invention include systems and methods for processing electromagnetic waves and signals, including transmitters, receivers, digital signal processors, modulators, filters, methods of transmission, modulation schemes, etc. The embodiments described in this application may be implemented in a wide range of applications, such as, for example, simulcast communication systems and methods. The invention also may be implemented in non-simulcast communication systems and methods to decrease bit error rates resulting from, for example, delay spread multi-path fading.

In many communication systems, data is communicated in the form of symbols, with each symbol representing one or more bits of information. For example, a four-level modulation scheme uses four symbols, with each symbol encoded with two bits of information. In radio frequency (RF) communication systems, symbols are modulated and transmitted on a carrier wave. The symbols are transmitted at a certain rate (the symbol transmission rate), which may be measured in hertz (Hz) or baud (Bd). The amount of time used to transmit a single symbol is known as the symbol period, which is the inverse of the symbol transmission rate. Traditional simulcast communication systems using modulations specified in the P25 specification have experienced high bit error rates when the delay spread becomes larger than a small fraction (e.g., 20-25%) of the symbol period.

Figure 1:
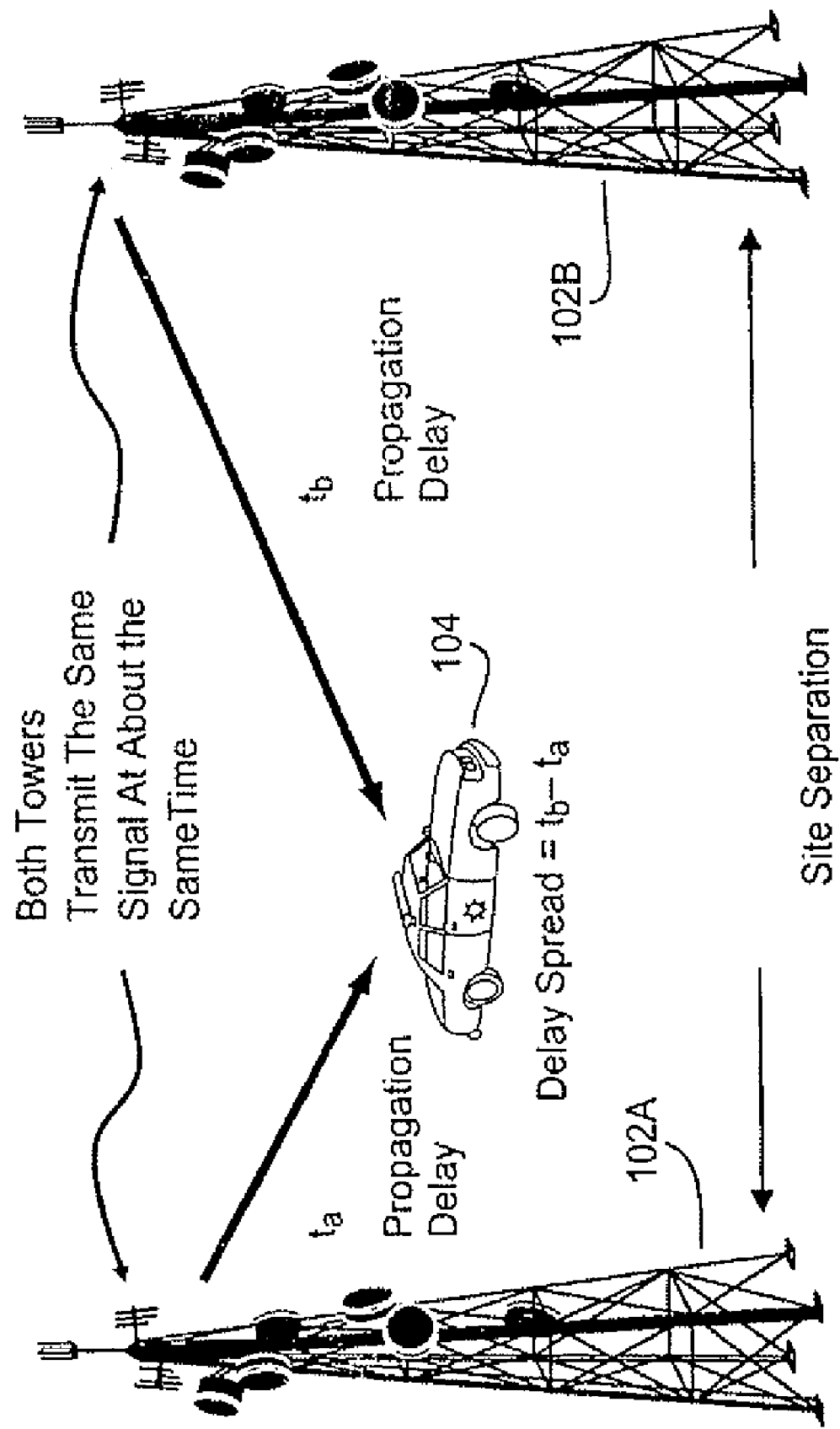
FIG. 1 is a diagram illustrating a simple simulcast transmission environment according to one aspect of the invention.

FIG. 1 is a diagram illustrating a simple simulcast transmission environment according to one aspect of the invention. The environment includes two sites 102A, 102B, and a single terminal 104 (e.g., the communication radio in a law enforcement vehicle). In typical simulcast systems, the sites are separated by three miles or more. Also, typical simulcast systems will often have more than the two transmitter sites that are shown in this simple figure.

As illustrated in FIG. 1, both sites 102A, 102B transmit the same signal at about the same time. The terminal 104 receives the signal from both sites 102A, 102B, but generally at different times. Based on the distance between the first site 102A and the terminal 104, the propagation delay of the signal from the first site 102A is $t_a$. Similarly, based on the distance between the second site 102B and the terminal 104, the propagation delay of the signal from the second site 102B is $t_b$. Because the first site 102A is closer than the second site 102B to the terminal 104, the signal from the first site 102A arrives at the terminal 104 first. The delay before receipt of the same signal from the second site 102B is defined as the delay spread, $t_b$-$t_a$.

Figure 2:
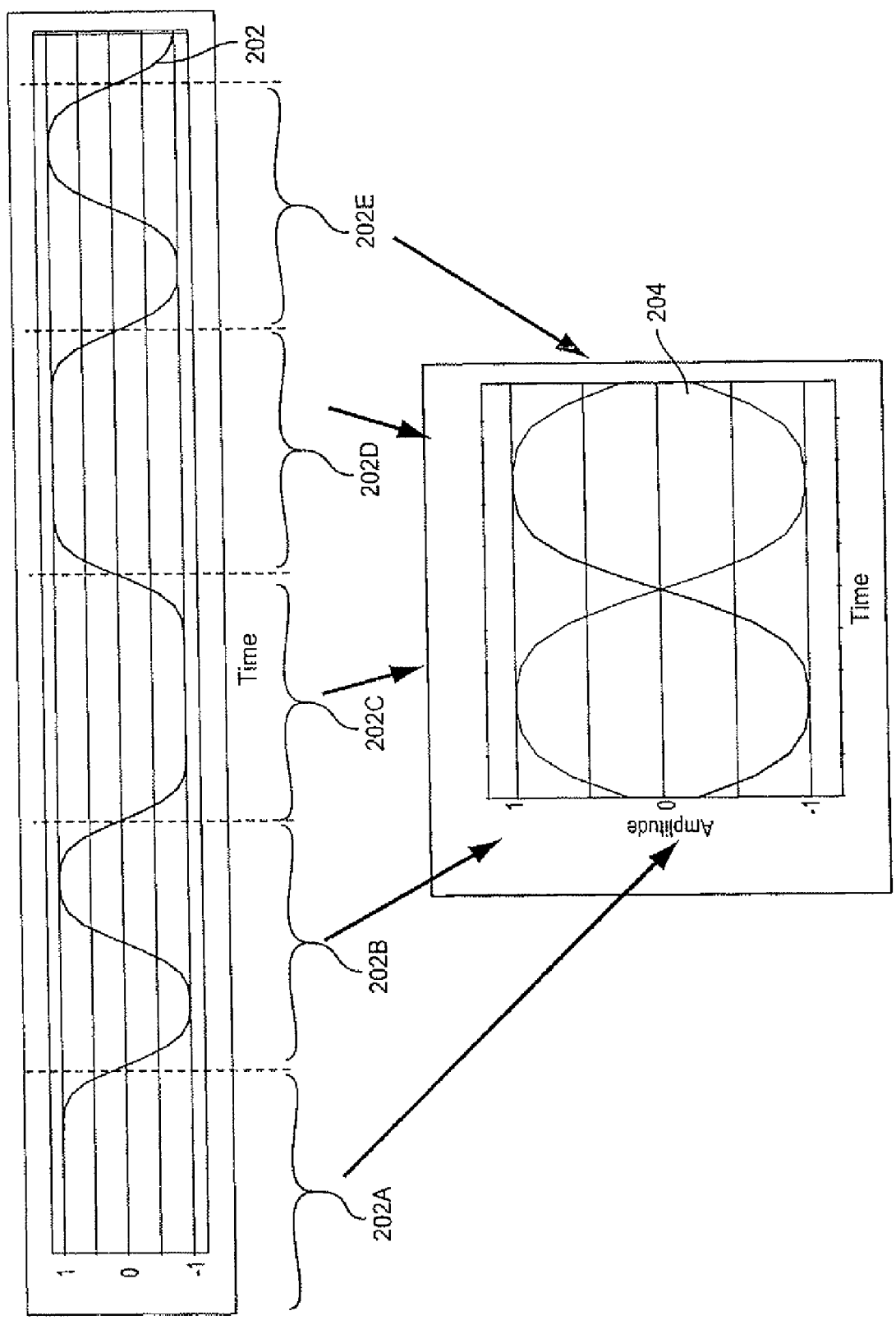
FIG. 2 is a time diagram illustrating the eye pattern of a simple signal over multiple symbol periods according to another aspect of the invention.

In analyzing the effect of delay spread, it is helpful to consider the "eye pattern" created by signal over a series of symbol periods. FIG. 2 is a time diagram illustrating the eye pattern of a simple two level signal 202 over ten symbol periods 202A-E. As shown in FIG. 2, the signal pattern over a series of symbol periods 202A-E may be superimposed to show the pattern 204 of the signal 202 over many symbol periods 202A-E. This pattern 204 is referred to as the "eye pattern" because of its resemblance to open eyes. The eye pattern 204 illustrated in FIG. 2 is shown in two symbol periods, but similar eye patterns may be observed by superimposing portions of a signal over a longer or shorter time period (e.g., any integer multiple of the symbol period).

The eye pattern of a signal over time is significant because an "open" eye pattern reduces the ambiguity of the data symbols modulated on the carrier frequency. In effect, an open eye pattern makes it easier to detect the correct symbol in a given symbol period. This reduces errors in data recovery based on the received signal. In other words, an open eye pattern results in a lower bit error rate.

Figure 3:
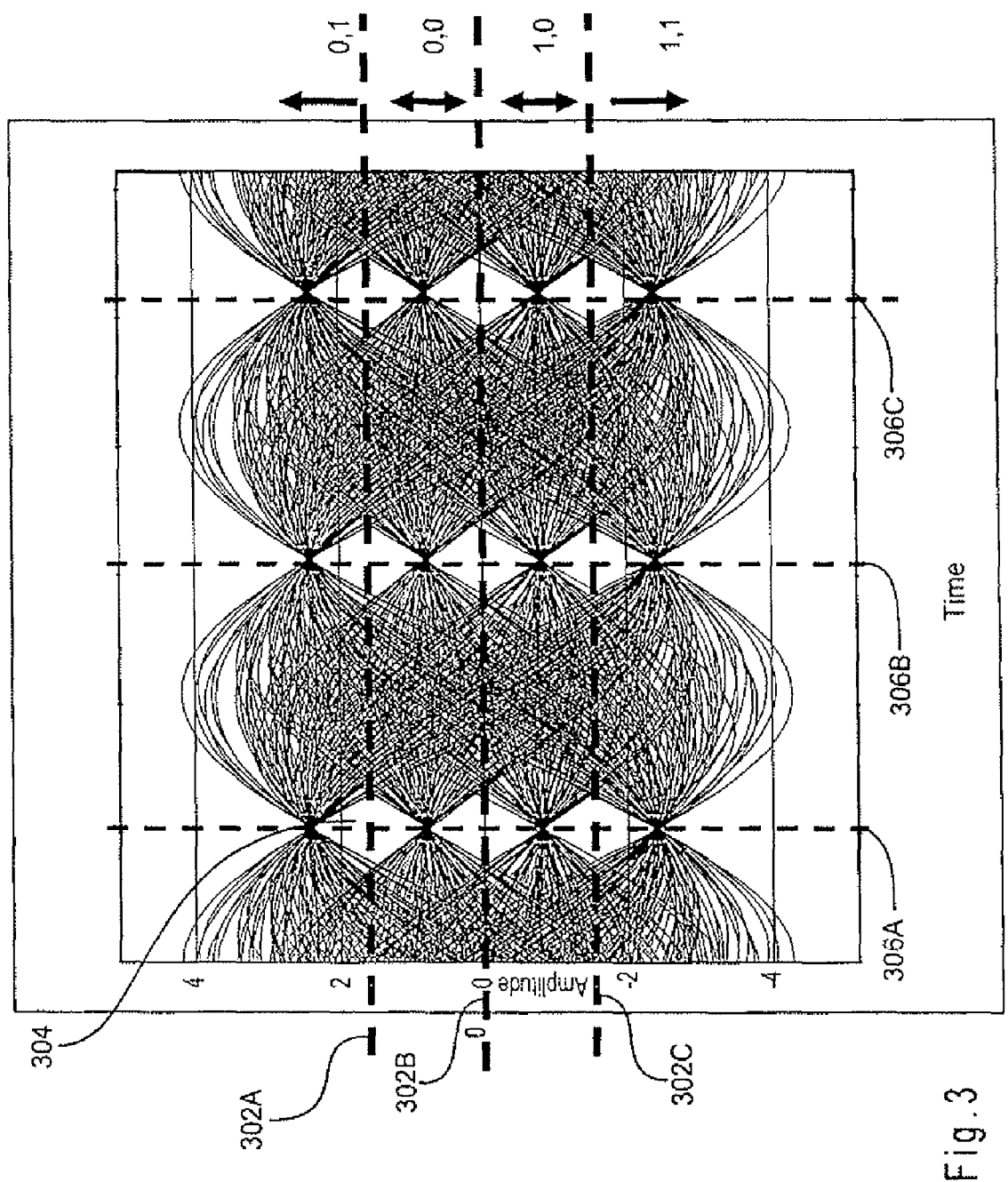
FIG. 3 is a time diagram illustrating the eye pattern of a four-level P25-compliant C4FM signal according to another aspect of the invention.

FIG. 3 is a time diagram illustrating the eye pattern of a four-level signal. Three thresholds 302A-C are used to separate the four possible symbol values. A sampled signal value greater than threshold 302A is interpreted as the symbol +3 which represents bits "0,1"; a value between the thresholds 302B and 302A is interpreted as the symbol +1 which represents bits "0,0"; a value between the thresholds 302C and 302B is interpreted as the symbol −1 which represents "1,0"; and a value less than the threshold 302C is interpreted as the symbol −3 which represents "1,1". The ideal sampling points 306A-C for sensing the correct symbols are shown in the middle of the open eye patterns (e.g., eye pattern 304).

Figure 4:
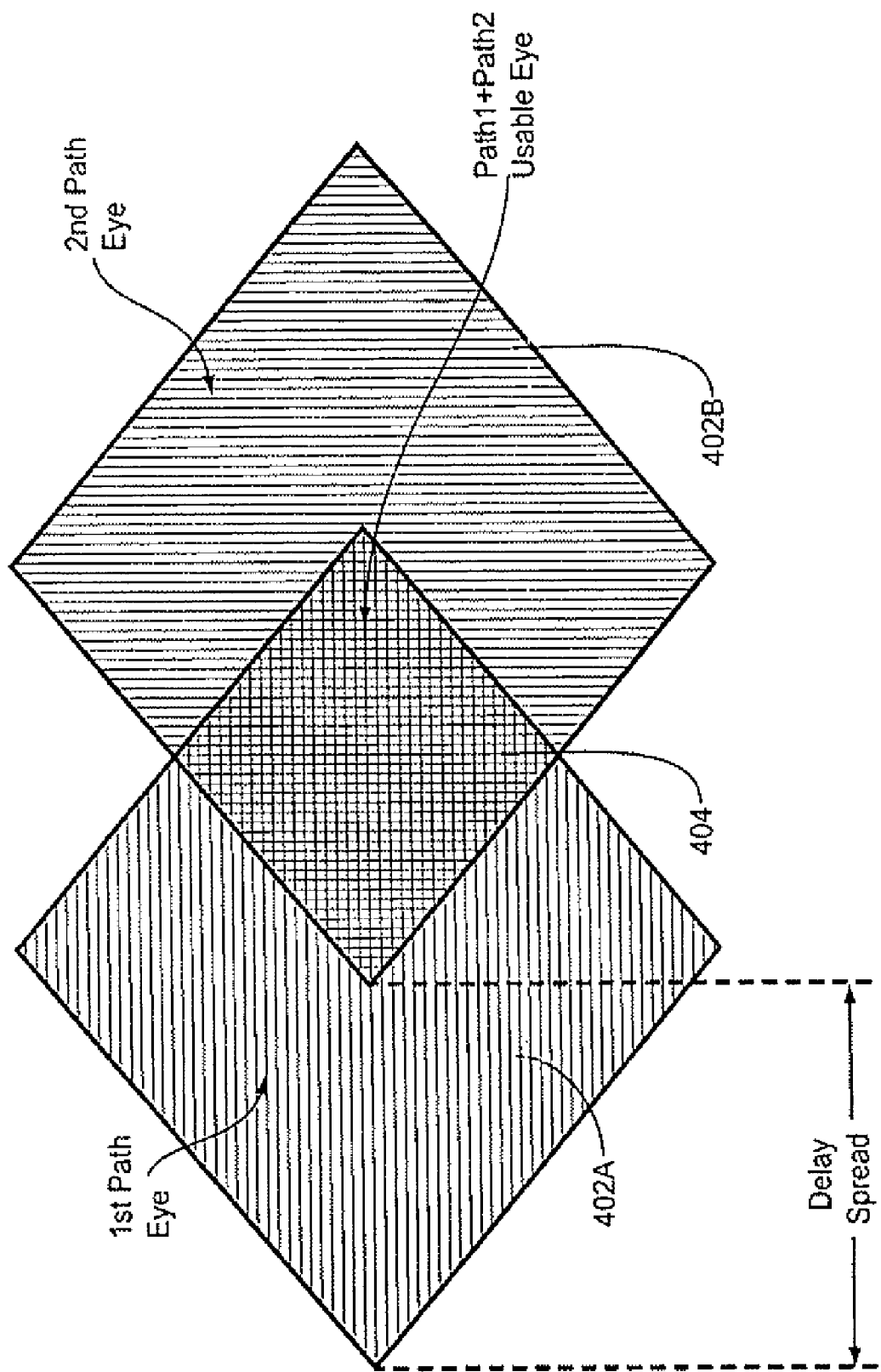
FIG. 4 is a time diagram illustrating the effect of delay spread on the eye pattern of a signal according to another aspect of the invention.

The interference effect of delay spread is illustrated in FIG. 4. This figure is a time diagram showing two versions 402A-B of the same signal received at different times over different paths (e.g., from different sites). The two signal versions 402A, 402B are transmitted and received on the same carrier frequency, so they interfere with one another. By themselves, both versions 402A-B of the signal have large open eye patterns. However, when the two signal versions 402A-B partially overlap as a result of delay spread, the size of the resulting effective eye pattern 404 is reduced.

Figure 5:
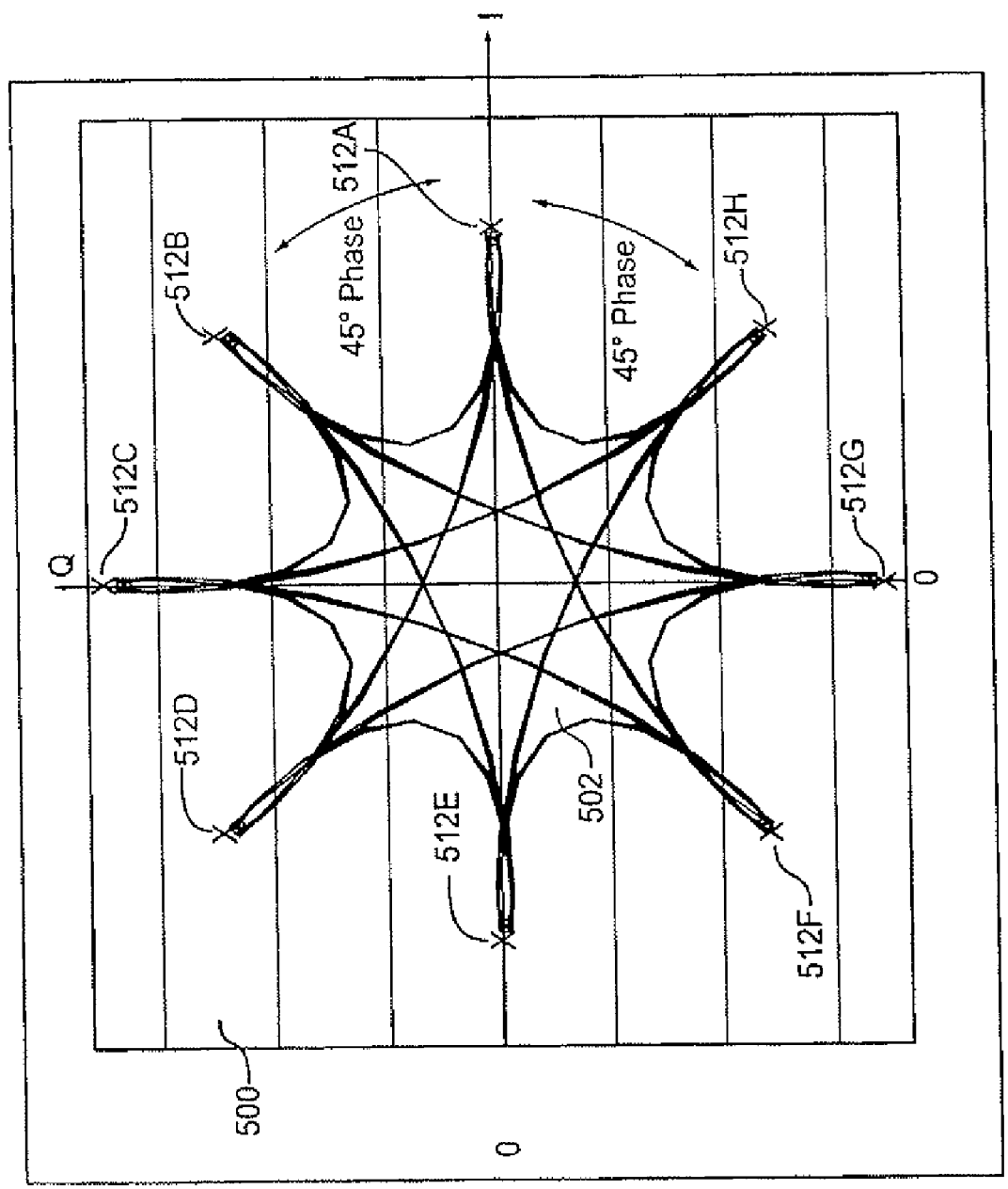
FIG. 5 is a diagram of a signal passing between QPSK constellation points on an I,Q coordinate plane according to another aspect of the invention.

Based on the observations described above, one aspect of the invention seeks to reduce the bit error rate of a signal by increasing the size of the effective signal eye pattern under delay spread conditions. One way to accomplish this, particularly for communication systems that use phase-shift keying (PSK) modulation schemes, is to maintain the phase of the transmitted signal close to the desired symbol phase for a substantial portion of the symbol period. For example, filtering may be employed in the signal modulation process to ensure that the phase of the modulated carrier signal remains within a certain range of the desired phase for substantial portion of the symbol period.

π/4 Differential Quadrature Phase-shift keying (DQPSK) is one modulation scheme used in communication systems. DQPSK represents four possible symbol values using differential phases between eight constellation points on an I,Q coordinate plane. FIG. 5 is a diagram of the eight constellation points 512A-H on the I,Q coordinate plane 500. Each of the constellation points 512A-H is separated from its two neighboring constellation points by an angular phase of 45 degrees.

Ideally, DQPSK signals represent symbols by transmitting at the phase of one of the eight constellation points 51 2A-H for one symbol period. During the subsequent symbol period, the signal is transmitted at the phase of a different constellation point. The difference in signal phase between the current symbol period and the previous symbol period represents the symbol for that period. Typically, the phase changes will be –135 degrees, –45 degrees, 45 degrees, or 135 degrees. These four phase changes represent the four symbols of the DQPSK modulation scheme.

In practice, it is impossible to maintain the phase of any single constellation point for the entire symbol period. The transition from one phase value to another phase value requires a finite amount of time and, during this time, the signal phase passes continuously between two constellation points. This is represented over a number of symbol periods by the path of signal 502 in FIG. 5. To achieve open eye patterns, the time required for this transition must be reduced by maintaining the signal phase value close to the constellation phase value for a substantial portion of the symbol period.

Figure 6:
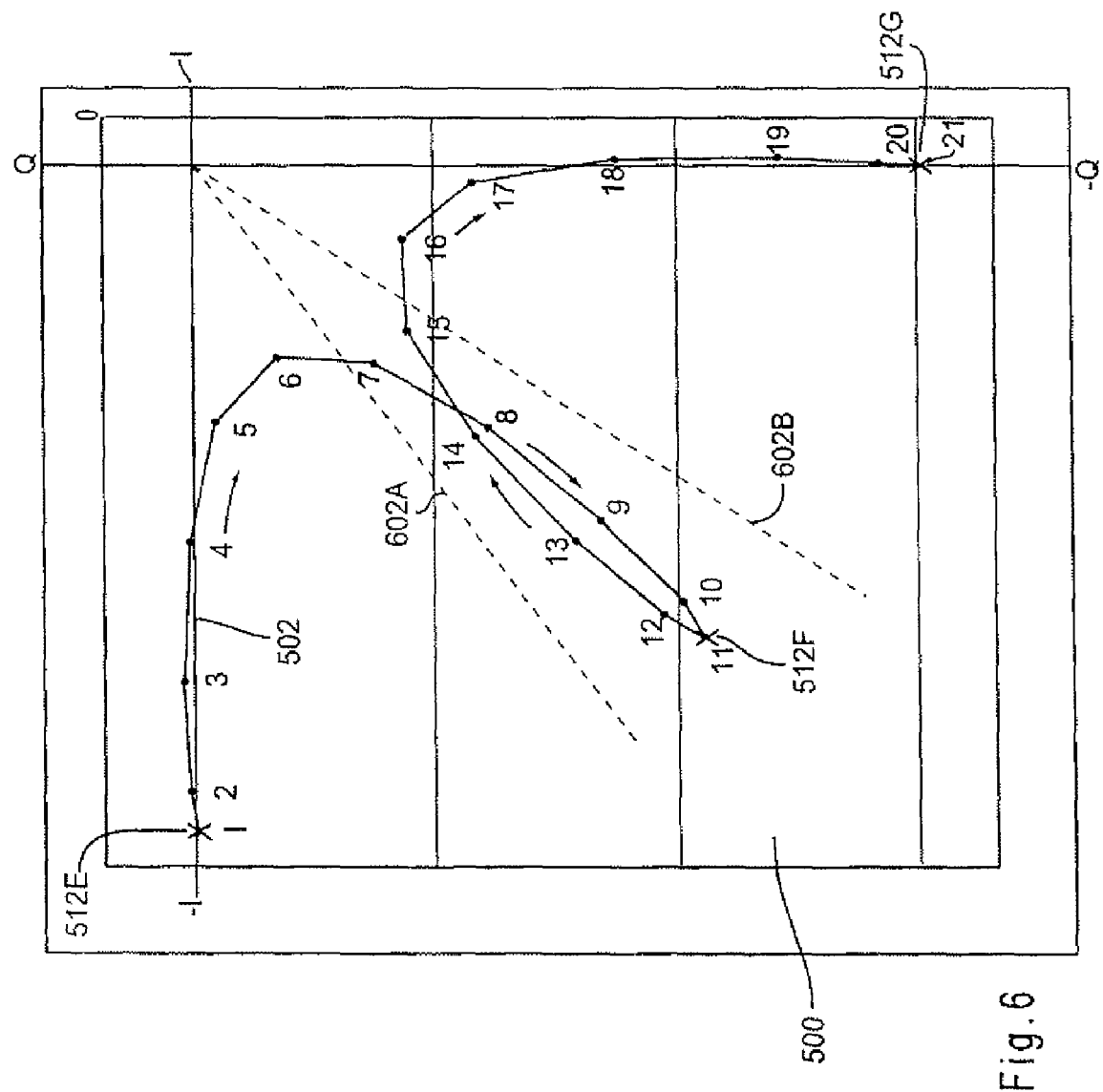
FIG. 6 is a diagram illustrating an enlarged view of the lower-left quadrant of the I,Q coordinate plane shown in FIG. 5.

FIG. 6 is a diagram illustrating an enlarged view of the lower-left quadrant of the I,Q coordinate plane shown in FIG. 5. As shown in FIG. 6, the signal 502 may be represented as a series of sample points (labeled 1-21). These twenty-one sample points represent the discrete values of the signal over the course of slightly over two symbol periods (i.e., 10× over-sampling). Sample 1 corresponds to a signal value equal to the constellation point 512E at a phase of 180 degrees. Over the next symbol period, the signal transitions through ten samples points (i.e., sample points 2-11) to the next constellation point 512F at a phase of 225 degrees. This represents a phase difference of 45 degrees, which corresponds to the "+1" symbol value.

Beginning with the next sample point 12, the signal again transitions through ten sample points (i.e., sample points 12-21) to the next constellation point 512G at a phase of 270 degrees. This represents another phase difference of 45 degrees, which corresponds to the same QPSK symbol value transmitted in the previous symbol period.

The signal illustrated in FIGS. 5 and 6 remains close in phase to a given constellation point for a substantial portion of the symbol period. For example, nine consecutive sample points (i.e., sample points 7-15) are within ten degrees of constellation point 512F. This is illustrated in FIG. 6 by boundary lines 602A-B, which are drawn at ten degree increments on either side of constellation point 512F (at angles of 215 degrees and 235 degrees, respectively). With ten samples in a symbol period, this means that the signal remains within ten degrees of the desired symbol phase for more than 80% of the symbol period.

The ten degree tolerance generally is sufficient to provide for wide time domain eye patterns in DQPSK modulation schemes. Ten degrees represents approximately 25% of the 45-degree separation between DQPSK constellation points on the I,Q plane for a +1 or –1 symbol and less than 8% of the 135-degree degree separation between DQPSK constellation points on the I,Q plane for a +3 or –3 symbol. This should provide an appropriate phase tolerance for most DQPSK modulation schemes. However the tolerance may be less, or even slightly more, depending on the particular modulation scheme.

One embodiment of the invention employs a filter to ensure that the signal phase remains close to the desired symbol phase for a substantial portion of the symbol period. For example, a modified raised cosine filter may be used. The following discussion relates specifically to raised cosine filters and P25-compatible system. However, one of skill in the art will understand that the invention also is applicable to other types of pulse-shaping filters which may be used to maintain a signal phase close to a desired symbol phase for a substantial portion of the symbol period.

Standard raised cosine filters are often used in existing simulcast communication systems such as P25-compliant systems. However, the design of the standard raised cosine filters has resulted in relatively high bit error rates resulting from delay spread, which closes the eye pattern of the received signal and makes it more difficult to accurately sense the correct symbol in a given symbol period. For example, for delay spreads of 60 microseconds, the bit error rate in existing systems using the P25-compliant C4FM and CQPSK modulation schemes is over 5%. The bit error rate may be dramatically reduced, even for larger delay spreads, by modifying the raised cosine filter to maintain the signal phase close to the desired symbol phase for a substantial portion of the symbol period.

Figure 7:
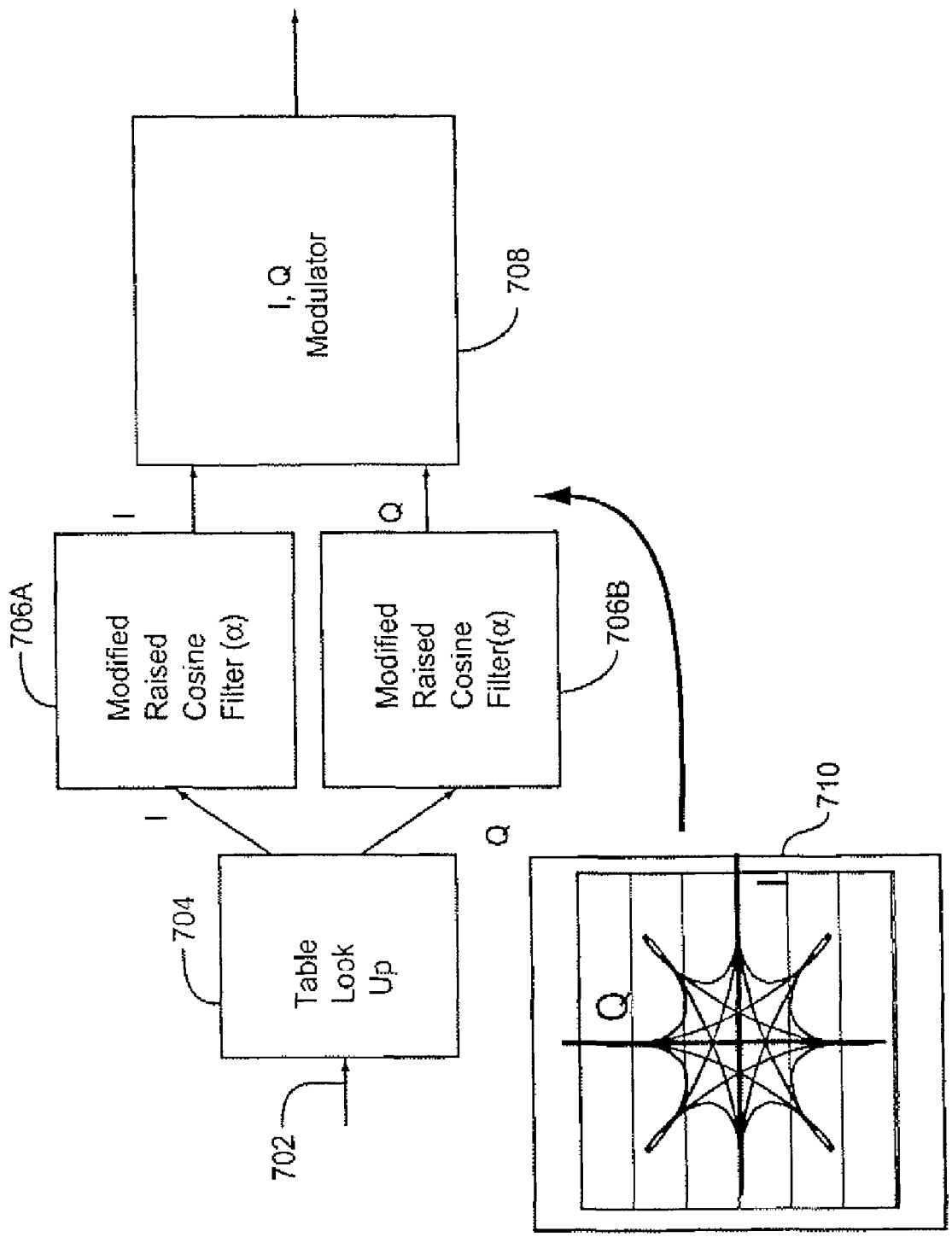
FIG. 7 is a block diagram illustrating a transmit signal modulator according to another aspect of the invention.

FIG. 7 is a block diagram illustrating a transmitter according to another aspect of the invention. The transmitter includes a lookup table 704 that receives a series of desired symbols at its input 702 and converts each of the symbols into a I,Q constellation point. Prior to conversion, the symbol may be represented in any convenient manner. For example, the symbols in a four-level system may be represented as –3, –1, 1, and 3. The lookup table 704 converts each of these symbols into I,Q constellation points. A series of digital I,Q samples (representing a series of symbols) is passed as digital input signals to I and Q raised cosine filters 706A-B as shown in FIG. 7.

The raised cosine filters 706A-B smooth the digital input signals at a particular sampling rate to produce a digital output signal 710 having desired characteristics. For example, according to one aspect of the invention, the raised cosine filters 706A-B may be designed to maintain the signal phase close to the desired symbol phase for a substantial portion of the symbol period. The digital output signal 710 produced by the raised cosine filters 706A-B includes a series of samples at the particular sampling rate. The series of samples in the digital output signal 710 represent the desired symbols using differential phase values among the eight constellation points on the I,Q coordinate plane, as described above. The digital output signal 710 is passed to an I,Q modulator 708, which modulates the digital output signal 710 on a carrier wave at the desired frequency.

The raised cosine filter may be modified to maintain the signal phase close to the desired symbol phase and correspondingly widen, in the time domain, the eye pattern of the transmitted signal. One such modification is to increase the two-sided bandwidth of the raised cosine filter to be substantially greater than the symbol transmission rate. One way to measure the bandwidth of the raised cosine filter is to compare the two-sided 6 dB bandwidth of the filter to the symbol transmission rate. For example, the two-sided 6 dB bandwidth of the raised cosine filter may be increased to equal approximately 150% of the symbol transmission rate.

Figure 8:
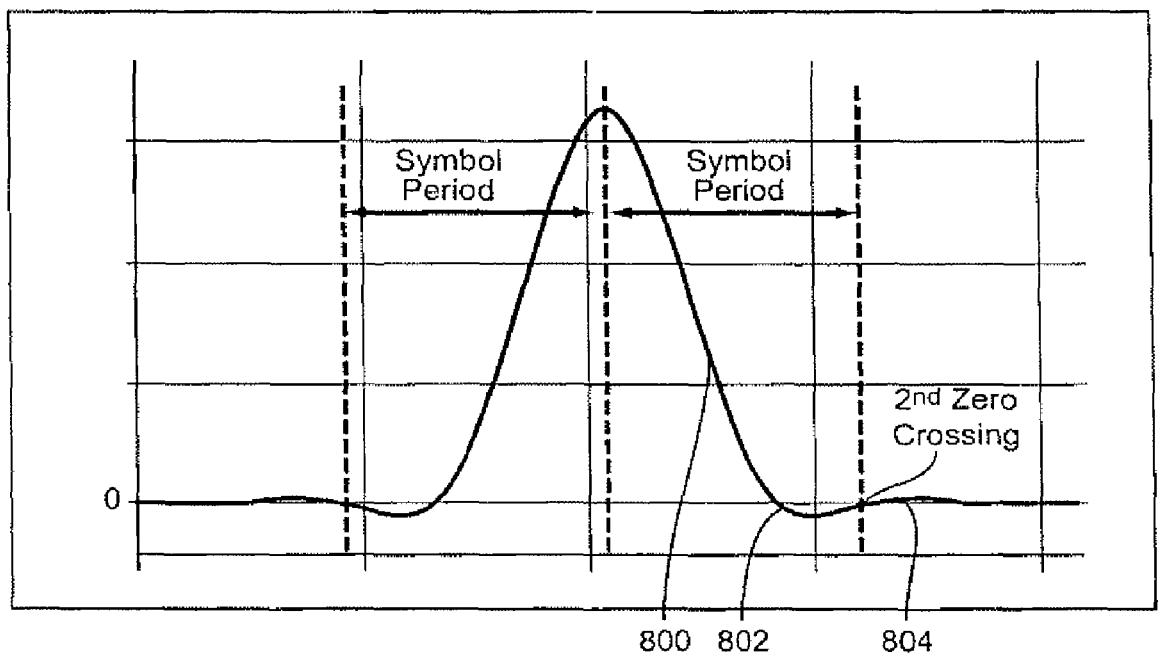
FIG. 8 is a time diagram illustrating the time domain impulse response of a modified raised cosine filter according to another aspect of the invention.

FIG. 8 is a time diagram illustrating the time domain impulse response 800 of a modified raised cosine filter according to another aspect of the invention. The bandwidth and rolloff factor of the raised cosine filter have been increased which compresses the width of the time domain impulse response 800. The time domain impulse response includes a peak and at least two zero crossings 802, 804 on either side of the peak. With the bandwidth and rolloff factor of this particular raised cosine filter increased to 150% of the symbol rate and 1 respectively, the second zero crossing 804 of the impulse response is offset from the peak by one symbol period. Like traditional raised cosine filter implementations, which place the first zero crossing from the peak by one symbol period, this design still minimizes inter-symbol interference. Unlike traditional raised cosine filters, however, this design achieves a wider time domain eye pattern, and it maintains the phase of the signal close to the desired symbol phase for a larger portion of the symbol period. It also maintains sufficient smoothing of the transmitted signal to adequately confine the transmit spectrum for meeting applicable regulatory requirements. Variations on this increased-bandwidth filter design also are possible and within the scope of the invention.

Figure 9A:
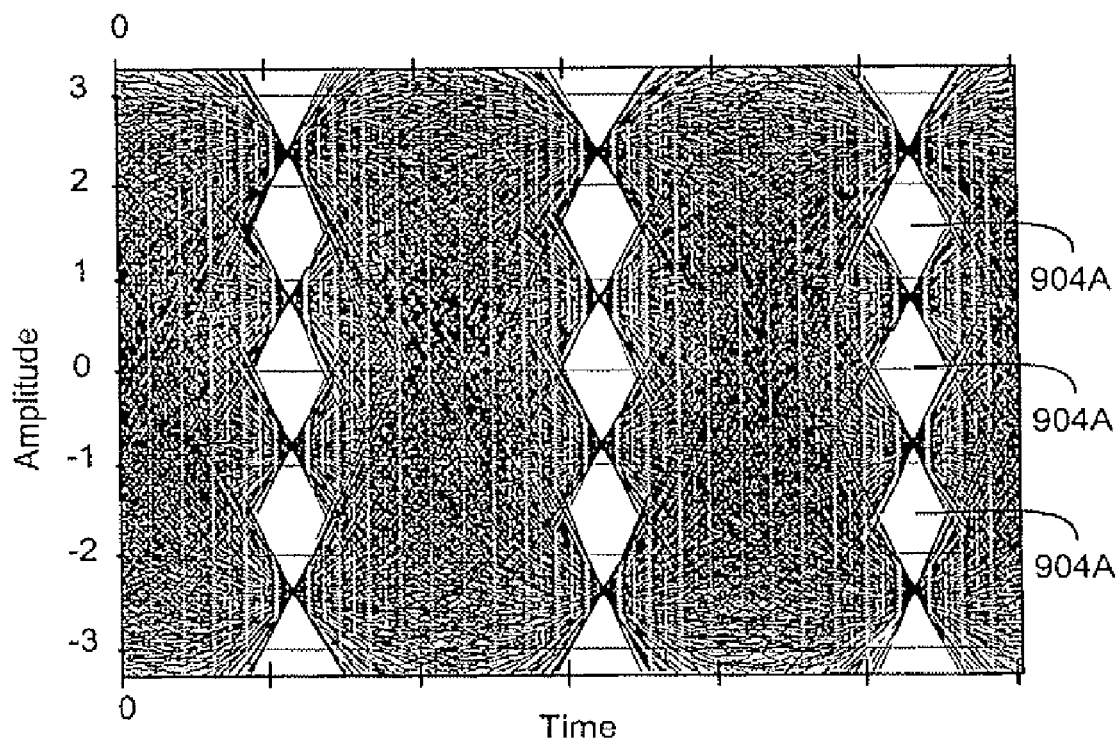
FIGS. 9A-D are time diagrams illustrating the comparative eye patterns produced by various P25-compatible modulation schemes.
Figure 9B:
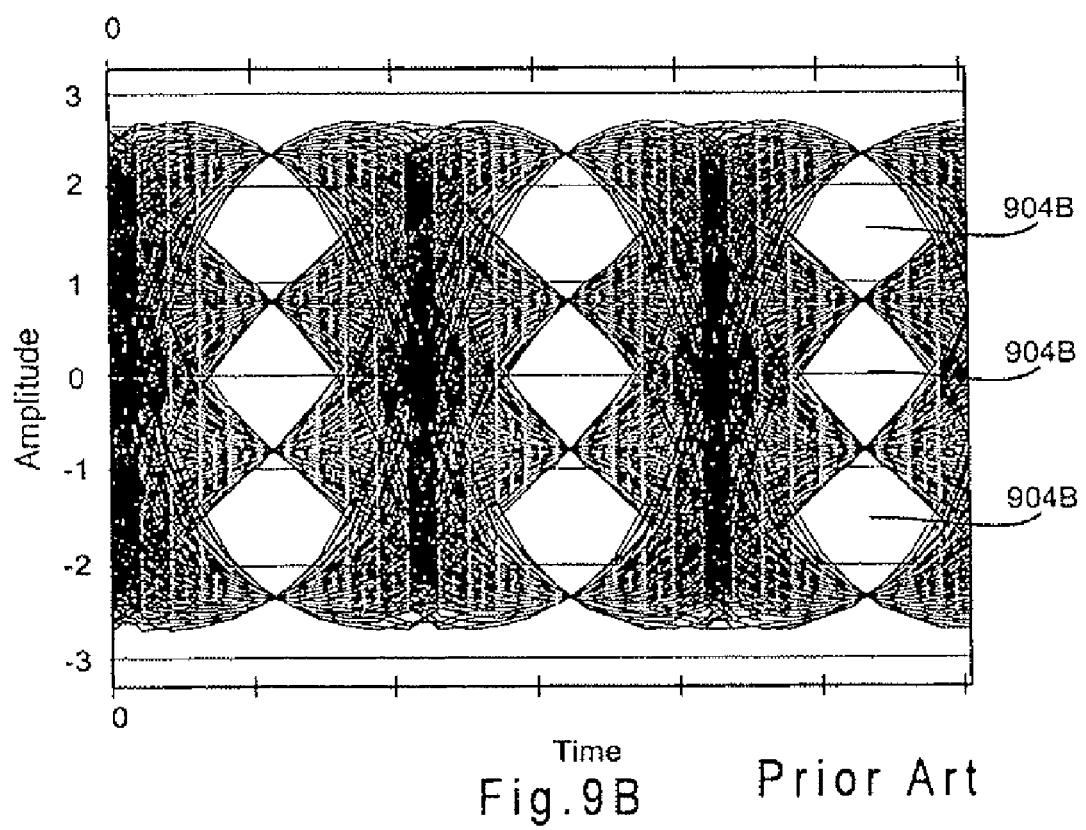

FIGS. 9A-D are time diagrams illustrating the comparative eye patterns produced by various P25-compatible modulation schemes. FIG. 9A illustrates the eye pattern of a C4FM modulation scheme with a roll-off factor of 0.2 according to the existing P25 standard. Similarly, FIG. 9B illustrates the eye pattern produced by a CQPSK modulation scheme with a roll-off factor of 0.2 according to the existing P25 standard. The signal illustrated in FIGS. 9A and 9B both have relatively narrow eye patterns 904A, 904B that can be degraded by relatively small delay spreads. These modulation schemes do not maintain the signal phase close to the desired symbol phase for more than about 25% of the symbol period.

Figure 9C:
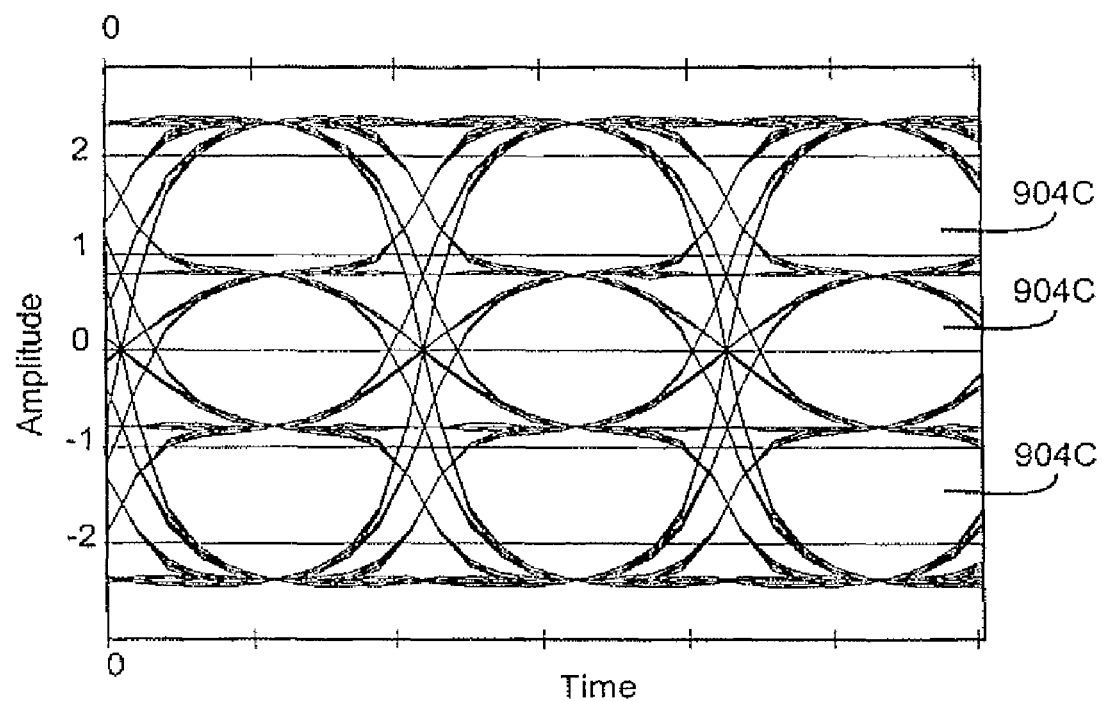

By contrast, according to various aspects of the invention, the signal phase can be maintained close to the desired symbol phase for more than 50% of the symbol period. For example, FIG. 9C illustrates the eye pattern produced by a modified CQPSK modulation scheme with a roll-off factor of 1 according to another aspect of the invention. This modified modulation scheme maintains the signal phase close to the desired symbol phase for approximately 60% of the symbol period. Because this modified modulation scheme maintains the signal phase close to the desired symbol phase and widens the eye pattern 904C of the transmitted signal, it is more tolerant of increased delay spreads.

Figure 9D:
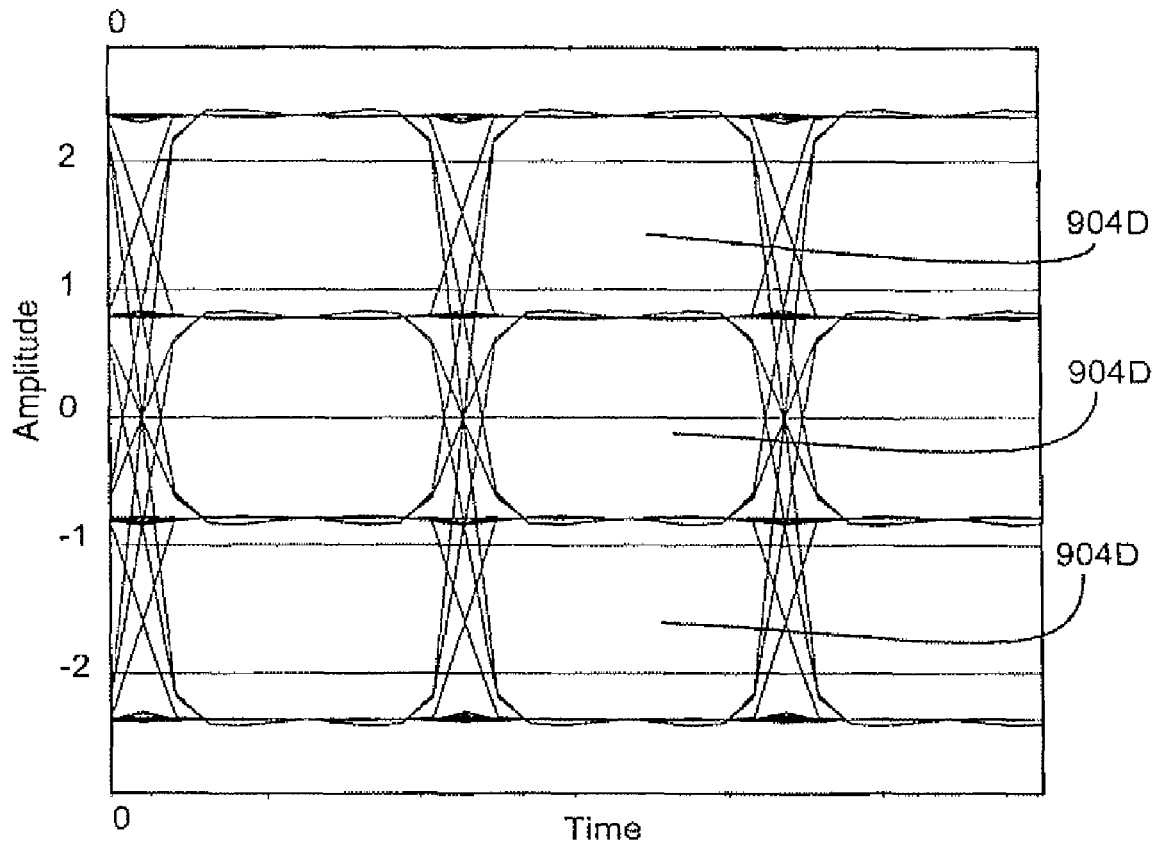

According to other aspects of the invention, the signal phase can be maintained close to the desired symbol phase for more than 75% of the symbol period. For example, FIG. 9D illustrates the eye pattern produced by a wide eye pattern-CQPSK (WCQPSK) modulation scheme according to another aspect of the invention. This WCQPSK modulation scheme uses a raised cosine filter with a bandwidth that is substantially higher than the symbol transmission rate. The bandwidth of this particular filter is increased such that the second zero crossing of its time domain impulse response is offset by one symbol period from the impulse response peak, as shown in FIG. 8. In addition, the roll-off factor of this particular filter is increased to 1. Based on the modifications to the raised cosine filter, the WCQPSK modulation scheme produces wide open eye patterns 904D, maintaining the signal phase close to the desired symbol phase for over 80% of the symbol period. The improved signal results shown in FIGS. 5 and 6 also are based on this improved modulation scheme.

Because the WCQPSK modulation scheme maintains the signal phase close to the desired symbol phase for over 80% of the symbol period and produces wide open eye patterns, it substantially reduces the bit error rate of the transmitted signal compared with existing modulation schemes. Comparative results are shown in FIG. 10.

Figure 10:
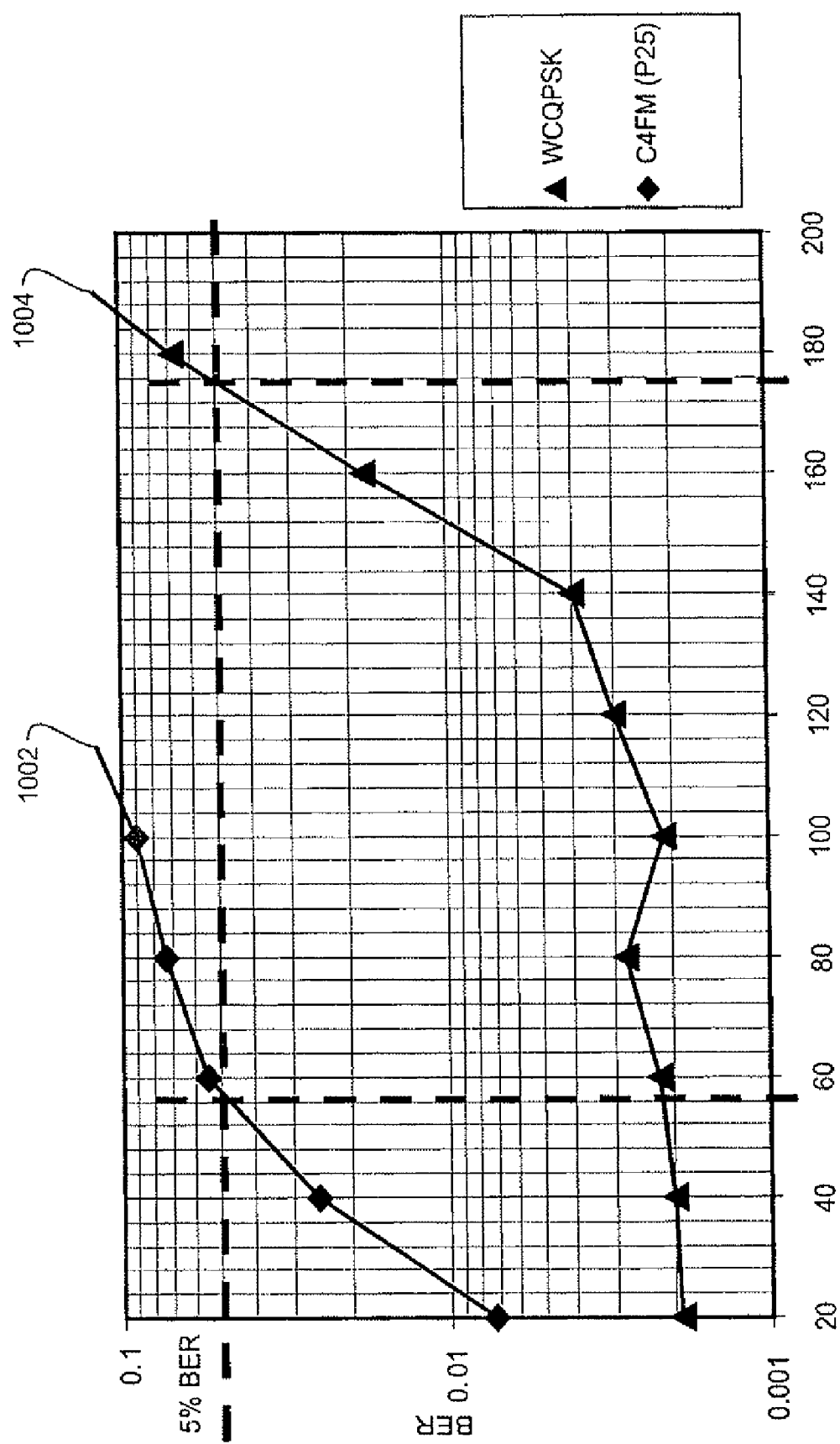
FIG. 10 is a chart illustrating comparative bit error rates for the existing P25 C4FM modulation scheme and a WCQPSK modulation scheme according to another aspect of the invention.

FIG. 10 is a chart illustrating comparative bit error rates for the existing C4FM modulation scheme and a WCQPSK modulation scheme according to another aspect of the invention. The bit error rates for strong signals are charted against a range of delay spreads (in microseconds). As illustrated in FIG. 10, the existing P25 C4FM modulation scheme produces a 5% bit error rate 1002 with delay spreads of 60 microseconds or less. The WCQPSK modulation scheme produces much better results. It tolerates delay spreads of over 170 microseconds before producing a 5% bit error rate 1004. Thus, the WCQPSK scheme provides dramatic improvement (reduced bit error rates) over the existing P25 C4FM scheme.

Another advantage of the modified CQPSK and WCQPSK modulation schemes described above is that they are generally compatible with existing P25 systems. For example, only the base stations of a given system need to be capable of transmitting according to one of the improved modulation schemes, such as WCQPSK. Transmissions from terminals are not simulcast, so they are not prone to the simulcast delay spread. In addition, at most only simple modifications need be made to existing P25 radios to facilitate reception of signals transmitted using these schemes.

Figure 11:
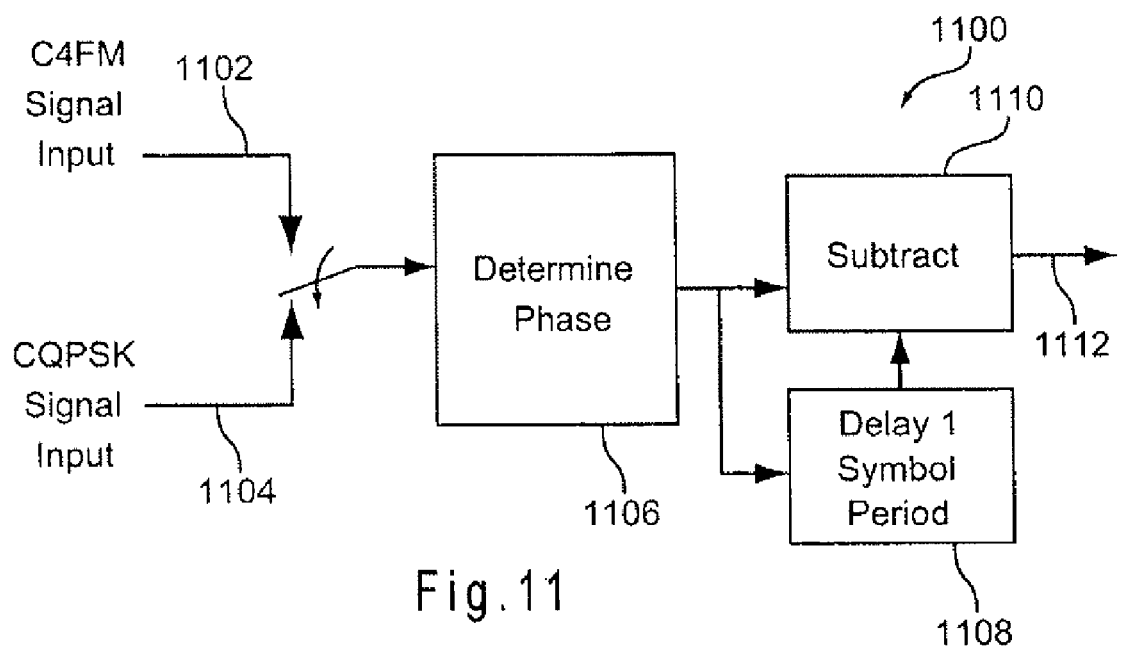
FIG. 11 is a block diagram illustrating a P25 received signal demodulator according to another aspect of the invention.

FIG. 11 is a block diagram illustrating a P25-compatible receiver 1100 according to another aspect of the invention. The receiver 1100 is capable of receiving both C4FM signal input 1102 and CQPSK signal input 1104 (including WCQPSK signal input). The receiver 1100 includes a phase determination component 1106. The phase determination component detects the phase of a given sample in the received signal. For example, the phase determination component may employ a frequency discriminator followed by known filters, such as integrate-and-dump filters, to detect the differential phase. To accommodate WCQPSK signal inputs, the integrate-and-dump filter should be scaled such that signal overflow wraps from 180 degrees to −180 degrees and vice-versa. Based on the phase determined by the phase determination component 1106, the receiver employs a delay component 1108 and a subtract component 1110 to determine the change in phase 1112 over a given symbol period. This phase change can then be converted back to the original symbol and bit values through use of the symbol thresholding process, as described above with respect to FIG. 3, or other means including soft decision techniques.

Figure 12:
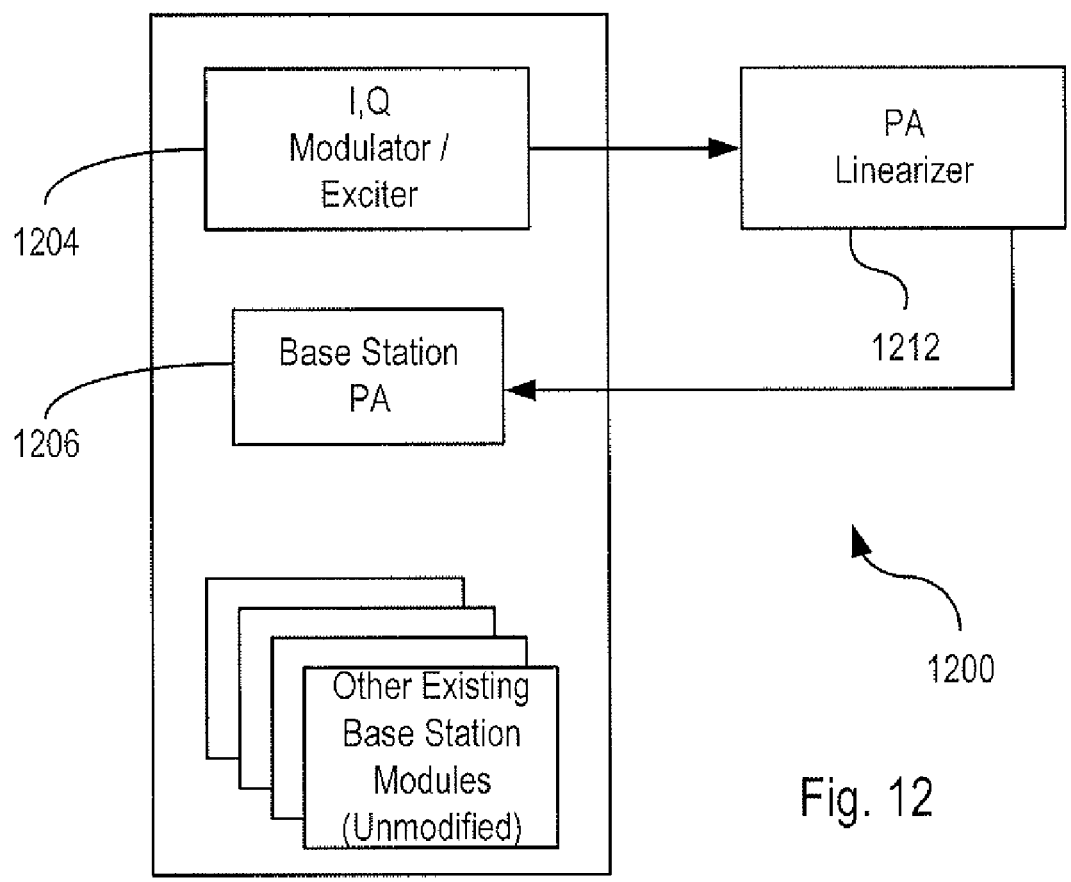
FIG. 12 is a block diagram illustrating a base station according to another aspect of the invention.

FIG. 12 is a block diagram 1200 illustrating a P25-compatible base station according to another aspect of the invention. The changes necessary to implement the new modulation schemes described above may be implemented in a digital signal processor (DSP) of the I,Q Modulator/Exciter 1204. For example, any of the modified raised cosine filters described above may be implemented in the I,Q Modulator/Exciter 1204. As a result, the I,Q Modulator/Exciter 1204 produces a modulated output signal with a phase characteristic that remains close to the desired symbol phase for a substantial portion of the symbol period. The output signal is then processed by a power amplifier linearizer 1212, before being amplified by the power amplifier 1206.

Although various embodiments of the invention have been described in the context of P25-compatible systems, one of ordinary skill in the art will recognize that the invention may be applied to other types of simulcast communication systems to reduce bit error rates resulting from delay spread. In addition, the invention may be applied to non-simulcast communication systems to reduce bit error rates resulting from delay-spread multipath fading.

It is intended that the foregoing detailed description be regarded as illustrative rather than limiting, and that it be understood that the following claims, including all equivalents, are intended to define the scope of this invention.

The invention claimed is:

1. A method for generating a modulated carrier signal based on a plurality of data symbols, the method comprising:
   receiving a plurality of data symbols;
   generating a digital input signal based on the plurality of data symbols;
   filtering the digital input signal to produce a digital output signal including a phase characteristic, wherein the phase characteristic of the digital output signal remains within about ten degrees of a desired symbol phase for a duration that exceeds 50 percent of a symbol period corresponding to a symbol transmission rate; and
   modulating a carrier signal using the digital output signal to produce the modulated carrier signal,
   wherein the filtering is accomplished using a pulse-shaping filter that has a time domain impulse response having a peak and at least first and second zero crossings on either side of the peak, wherein said second zero crossing is offset from the peak of the time domain impulse response by about one symbol period.

2. The method of claim 1, wherein the phase characteristic of the digital output signal remains within about ten degrees of the desired symbol phase for a duration that exceeds 75 percent of the symbol period.

3. The method of claim 1, wherein the filtering further comprises selecting said pulse-shaping filter to comprise a raised cosine filter configured with said time impulse response at a roll-off factor that is equal to about 1.

4. The method of claim 1, wherein the filtering further comprises selecting said pulse-shaping filter to have a two-sided bandwidth that is substantially greater than the symbol transmission rate.

5. The method of claim 1, wherein the filtering produces less than a five percent bit error rate at a receiver of the modulated carrier signal in a simulcast delay spread condition of at least 50 percent of the symbol period.

6. The method of claim 1, wherein the filtering produces less than a five percent bit error rate at a receiver of the modulated carrier signal in a simulcast delay spread condition of at least 75 percent of the symbol period.

7. The method of claim 1, wherein the filtering further comprises selecting said pulse-shaping filter to comprise at least one raised cosine filter, the method further comprising:
   separating the digital input signal into an in-phase component and a quadrature component; and
   processing the in-phase and quadrature components using the at least one raised-cosine filter to generate the digital output signal.

8. The method of claim 1, wherein the filtering further comprises selecting said pulse-shaping filter to comprise a raised cosine filter configured for P25-compatible simulcast modulation.

9. A transmitter for a modulated carrier signal based on a plurality of data symbols, comprising:
   a converter configured to receive the plurality of data symbols and generate a digital input signal based on the plurality of data symbols;
   a pulse-shaping filter configured to receive the digital input signal and produce a digital output signal including a phase characteristic, wherein the filter is further configured to maintain the phase characteristic of the digital output signal within about ten degrees of a desired symbol phase for a duration that exceeds 50 percent of a symbol period corresponding to a symbol transmission rate, and wherein said filter is further configured to have a time domain impulse response with a peak and at least first and second zero crossings on either side of the peak, wherein said second zero crossing is offset from the peak of the time domain impulse response by about the duration of a symbol period corresponding to a symbol transmission rate; and
   a modulator configured to modulate a carrier signal using the digital output signal to produce the modulated carrier signal.

10. The transmitter of claim 9, wherein the pulse-shaping filter is further configured to maintain the phase characteristic of the digital output signal within about ten degrees of the desired symbol phase for a duration that exceeds 75 percent of the symbol period.

11. The transmitter of claim 9, wherein the pulse-shaping filter further comprises a raised cosine filter configured with said time impulse response at a roll-off factor that is equal to about 1.

12. The transmitter of claim 9, wherein the pulse-shaping filter is further configured with a two-sided bandwidth that is substantially greater than the symbol transmission rate.

13. The transmitter of claim 9, wherein the pulse-shaping filter is further configured to produce less than a five percent bit error rate at a receiver of the modulated carrier signal in a simulcast delay spread condition of at least 50 percent of the symbol period.

14. The transmitter of claim 9, wherein the pulse-shaping filter is configured to produce less than a five percent bit error rate at a receiver of the modulated carrier signal in a simulcast delay spread condition of at least 75 percent of the symbol period.

15. The transmitter of claim 9, wherein the pulse-shaping filter comprises at least one raised cosine filter configured to separately process an in-phase component of the digital input signal and a quadrature component of the digital input signal to generate the digital output signal.

16. The transmitter of claim 9, wherein the pulse-shaping filter comprises a raised cosine filter configured for P25-compatible simulcast modulation.

17. A filtering apparatus, comprising:
   a digital signal processor programmed with a set of instructions for implementing a filter, said filer configured to receive a digital input signal based on a plurality of data symbols and produce a digital output signal including a phase characteristic;

wherein the filter is further configured to maintain the phase characteristic of the digital output signal within about ten degrees of a desired symbol phase for a duration that exceeds 50 percent of a symbol period corresponding to a symbol transmission rate, and wherein said filter is further configured to have a time domain impulse response with a peak and at least first and second zero crossings on either side of the peak, wherein said second zero crossing is offset from the peak of the time domain impulse response by about the duration of a symbol period corresponding to a symbol transmission rate.

18. The filtering apparatus of claim 17, wherein the filter comprises a raised cosine filter configured with said time impulse response at a roll-off factor that equal to about 1.

19. The filtering apparatus of claim 17, wherein the filter is further configured with a two-sided bandwidth that is substantially greater than the symbol transmission rate.

20. The filtering apparatus of claim 17, wherein the filter comprises a raised cosine filter configured for P25-compatible simulcast modulation.

* * * * *